(12) United States Patent
Pokharel et al.

(10) Patent No.: US 7,920,354 B2
(45) Date of Patent: Apr. 5, 2011

(54) PHASE SERVO PATTERNS FOR BIT PATTERNED MEDIA

(75) Inventors: Puskal Prasad Pokharel, Bloomington, MN (US); Mustafa Can Ozturk, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/210,681

(22) Filed: Sep. 15, 2008

(65) Prior Publication Data

US 2010/0067142 A1    Mar. 18, 2010

(51) Int. Cl.
G11B 5/596 (2006.01)
G11B 5/09 (2006.01)

(52) U.S. Cl. .................................. 360/77.08; 360/49
(58) Field of Classification Search ............... None
See application file for complete search history.

(56) References Cited

U.S. PATENT DOCUMENTS

| | | | |
|---|---|---|---|
| 4,549,232 A | 10/1985 | Axmear et al. | |
| 4,912,576 A | 3/1990 | Janz | |
| 5,063,546 A | 11/1991 | Ito et al. | |
| 5,420,760 A | 5/1995 | Ansell et al. | |
| 5,452,285 A | 9/1995 | Monen | |
| 5,473,480 A | 12/1995 | Ishida | |
| 5,590,009 A * | 12/1996 | Ishida | 360/135 |
| 5,615,065 A | 3/1997 | Cheung | |
| 6,049,438 A | 4/2000 | Serrano et al. | |
| 6,051,299 A | 4/2000 | Uchiyama et al. | |
| 6,162,532 A | 12/2000 | Black et al. | |
| 6,304,398 B1 | 10/2001 | Gaub et al. | |
| 6,440,520 B1 | 8/2002 | Baglin et al. | |
| 6,529,341 B1 | 3/2003 | Ishida et al. | |
| 6,535,343 B1 * | 3/2003 | Bar-Gadda | 360/55 |
| 6,628,598 B2 | 9/2003 | Edwards et al. | |
| 6,775,081 B2 | 8/2004 | Ottesen et al. | |
| 6,810,004 B1 | 10/2004 | Sako | |
| 6,999,279 B2 | 2/2006 | Lundstrom | |
| 7,009,791 B2 * | 3/2006 | Shimatani | 360/29 |
| 7,119,975 B2 | 10/2006 | Blaum et al. | |
| 7,167,329 B2 | 1/2007 | Baker | |
| 7,231,731 B2 | 6/2007 | Muramatsu et al. | |
| 7,236,325 B2 * | 6/2007 | Albrecht et al. | 360/77.08 |
| 7,265,922 B2 | 9/2007 | Biskeborn et al. | |
| 7,307,807 B1 | 12/2007 | Han et al. | |
| 7,307,808 B2 * | 12/2007 | Kaizu et al. | 360/75 |
| 7,365,933 B2 | 4/2008 | Hamaguchi et al. | |
| 7,443,622 B2 | 10/2008 | Kaizu et al. | |
| 7,443,626 B2 | 10/2008 | Asakura et al. | |
| 7,492,540 B2 | 2/2009 | Albrecht | |
| 7,522,506 B2 | 4/2009 | Fasen | |
| 7,643,234 B2 * | 1/2010 | Albrecht et al. | 360/48 |
| 2006/0215310 A1 | 9/2006 | Zayas | |
| 2007/0258161 A1 | 11/2007 | Richter et al. | |
| 2007/0281078 A1 | 12/2007 | Kikitsu et al. | |

* cited by examiner

Primary Examiner — K. Wong
(74) Attorney, Agent, or Firm — David K. Lucente

(57) ABSTRACT

A recordable medium according to some embodiments includes a servo control field having a bit patterned media (BPM) pattern. The pattern includes a plurality of isolated magnetic islands or dots arranged in a down-track orientation and in a cross-track orientation. A phase of dots arranged on the medium in the servo control field varies in a first cross-track direction. The dots arranged on the medium may include a first phase pattern that has a first phase gradient in the first cross-track direction and a second phase pattern that has a second phase gradient, different from the first phase gradient, in the first cross-track direction. The dots may include a plurality of dot composites including a plurality of dots.

21 Claims, 9 Drawing Sheets

PHASE SERVO PATTERNS FOR BIT PATTERNED MEDIA

BACKGROUND

The present invention relates to data storage media and devices, and more particularly to data storage devices including magnetic bit patterned media.

In conventional magnetic data storage media, data bits are recorded using magnetic transitions on a magnetic recording layer that is composed of a random arrangement of single-domain particles. That is, the magnetic recording layer is typically a thin film of a magnetic material that includes a random arrangement of nanometer-scale grains, each of which behaves as an independent magnetic element. Each recorded bit is made up of many (50-100) of these random grains.

A stream of data bits is recorded as regions of opposite magnetization on the magnetic recording layer. As recorded on the medium, the stream of bits generally consists of equally spaced bit cells, with a digital '1' being indicated by a boundary (called a magnetic transition) between regions of opposite magnetization within a bit cell, and a '0' being indicated by a continuous region without such a boundary. The boundaries between regions of opposite magnetization occur along the boundaries between the grains. As the magnetic transitions follow the grain boundaries, the transitions are typically not made along straight lines.

Thus, due to the granular nature of the recording layer, the transitions may not be placed exactly where they are intended. Any deviations in grain boundaries represent medium noise, which limits the density of data that can be recorded on the medium.

If the grains are small enough, the magnetic transitions may be straight enough that it is easy to detect which bit cells contain a boundary and which do not. However, if the recording density is increased for a given grain size, the magnetic transitions become proportionally noisier, reducing the ability of the system to accurately recover the data.

One way to reduce the medium noise is to reduce the grain size. However, due to the superparamagnetic effect, the grain size has a lower physical limit. The superparamagnetic effect refers to the tendency of a grain's magnetization to reverse when the product of the grain volume and its anisotropy energy fall below a certain value. That is, as the grain volume decreases, the magnetization of the grain can become unstable.

An alternative to conventional magnetic recording approaches is to use a bit patterned media (BPM) technique. In bit patterned media, the bits do not contain as many grains as those in conventional media. Instead, bit patterned media comprise arrays of magnetic islands which are defined on a nonmagnetic disk surface during manufacturing. The magnetic islands can be magnetized to a desired polarity one at a time by a magnetic field generated by a write head passing over the islands. The magnetic islands (referred to herein as "dots") are physically separated from each other by regions of non-magnetic material. These nonmagnetic regions are referred to herein as "gaps" or "spaces." Thus, the magnetic field generated by a write head in response to a write current can only change the magnetization of the dots, while the gaps remain unmagnetized. The magnetic islands can be formed, for example, through lithography when the disk is manufactured.

Each island, or transition between islands, may represent one bit of information. For example, a positive polarity may represent a data '1', while a negative polarity represents a data '0.' Alternatively, a transition from an island having a first polarity to an adjacent island having a different polarity may represent a data '1', while a transition from an island having a first polarity to an adjacent island having the same polarity may represent a data '0.' The signal-to-noise ratio of a bit patterned medium is determined by variations in the spacing and sizing of islands, and can be improved considerably beyond that of conventional media recording schemes.

FIG. 1A is a simplified diagrammatic representation of a top view of a disk 34 having a surface 36 which has been formatted to be used in conjunction with a sectored servo system (also known as an embedded servo system). Data is stored on the disks 34 within a number of concentric tracks (or cylinders, in the case of a multi-disk stack) 40*a-h* on the disk surface 36. Each track 40*a-h* is divided into a plurality of sectors 42 separated by radially extending spokes 43. Each sector 42 is further divided into a servo sector 42*a* and a data sector 42*b*. The servo sectors of the disk 34 are used, among other things, to accurately position the read/write head so that data can be properly written onto and read from the disk 34. The data sectors 42*b* are where non-servo related data (i.e., host device data) is stored and retrieved. Although FIG. 1A only shows a relatively small number of tracks for ease of illustration, it should be appreciated that typically tens of thousands of tracks are included on the surface 36 of a disk 34.

The servo sectors 42*a* in each track 40 are radially aligned with servo sectors 42*a* in the other tracks, thereby forming servo wedges 45 which extend radially across the disk 34 (e.g., from the disk's inner diameter 44 to its outer diameter 46).

FIG. 1B is a view of a track 40 including sectors 42, each of which includes a servo sector 42*a* and a data sector 42*b*, from the frame of reference of a read/write head of the disk drive. The cross-track direction (i.e., moving from the inner diameter ID of a disk to the outer diameter OD, or vice-versa) is perpendicular to the track 40, while the down-track direction is parallel to the track 40.

FIG. 1C illustrates exemplary servo information 80 that may be stored in at least some of the servo sectors 42*a* within the radial sectors 42. The servo information 80 can include various servo control fields, such as a preamble field 82, a servo address mark (SAM) field 84, a track number field indicated by its least significant bits (LSBs) 86, a spoke number field 88, an entire track number field 90 which may be recorded in at least one of the servo spokes, and a servo burst field 92 of circumferentially staggered radially offset servo bursts (e.g., A, B, C, D servo bursts).

FIG. 1D illustrates a BPM configuration including a regular array of rows 13 of patterned magnetic islands (i.e. dots) 11 on a disk surface 15. In the data sector 42*b* of a disk track 42, a write head can be moved along a row 13 of islands 11 and switched or pulsed with electric current to cause the desired recording of data by magnetizing each island to a desired polarization (e.g. a positive or negative polarization).

SUMMARY

A recordable medium according to some embodiments includes a servo control field having a bit patterned media (BPM) pattern. The pattern includes a plurality of dots arranged in a down-track orientation and in a cross-track orientation. A phase of dots arranged on the medium in the servo control field varies in a first cross-track direction. The dots arranged on the medium may include a first phase pattern that has a first phase gradient in the first cross-track direction and a second phase pattern that has a second phase gradient, different from the first phase gradient, in the first cross-track direction.

A recordable medium according to further embodiments includes a servo control field including a bit patterned media (BPM) pattern including a plurality of dots arranged in a down-track direction and in a cross-track direction. A phase of dots arranged on the medium in the servo control field varies in the cross-track direction, and the dots include a plurality of dot composites including a plurality of dots.

A servo control system according to some embodiments includes a recordable medium including a servo control field having a bit-patterned media (BPM) pattern thereon. The BPM pattern includes a plurality of dots arranged in a down-track direction and in a cross-track direction. A phase of dots arranged on the medium in the servo control field varies in the cross-track direction and the dots include a plurality of dot composites including a plurality of dots. The system further includes a transducer that generates a readback signal in response to a magnetic field generated by the dots, and a controller that controls a position of the transducer in response to a readback signal from the transducer.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1A:
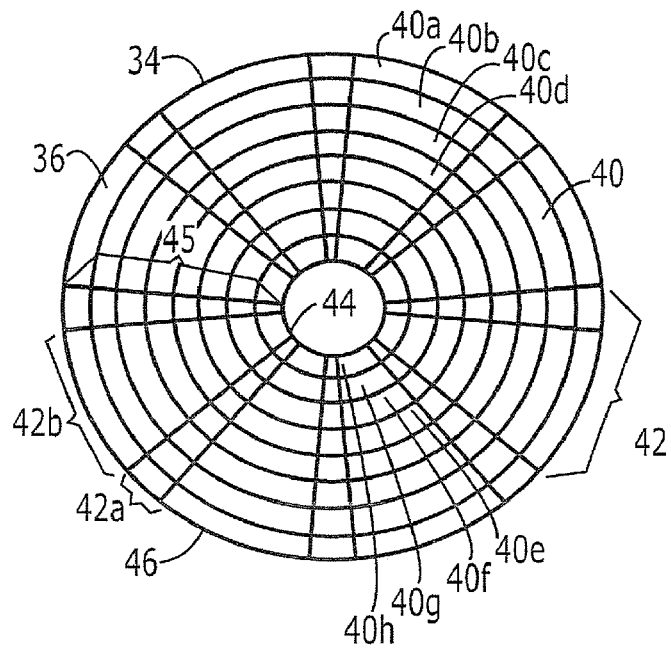
FIGS. 1A and 1B illustrates a layout of a disk surface.
Figure 1B:
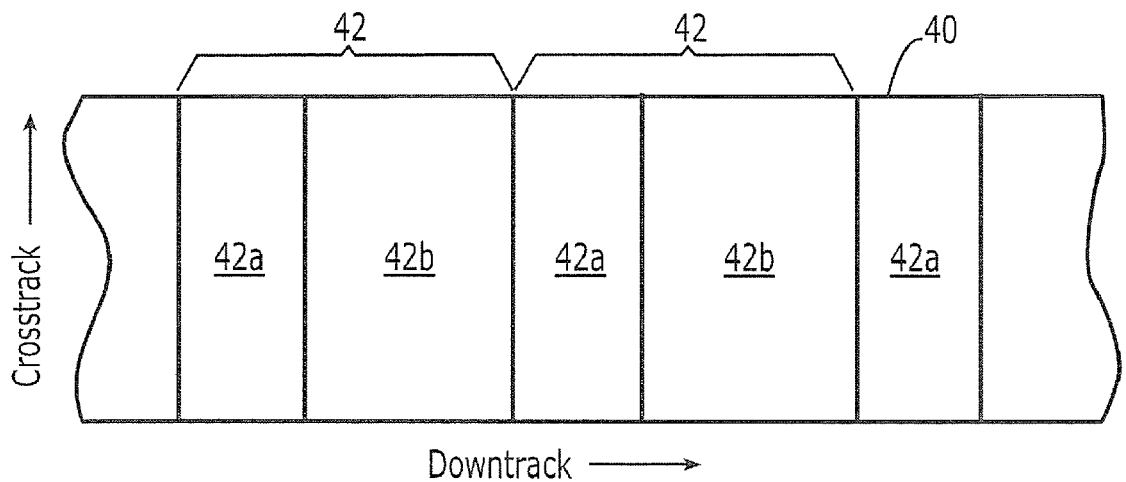
Figure 1C:
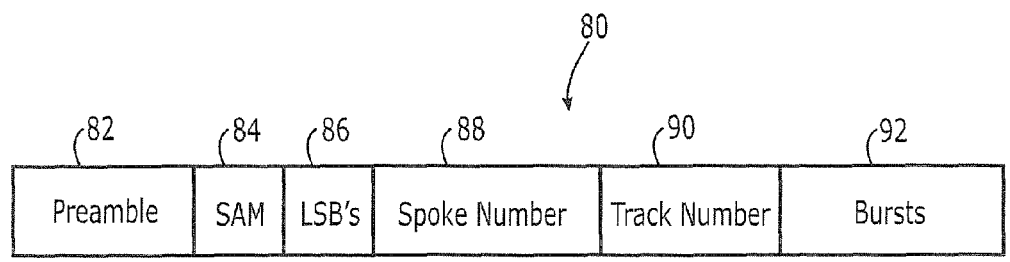
FIG. 1C illustrates exemplary servo control data that may be stored in at least some of the servo spokes of a disk drive.
Figure 1D:
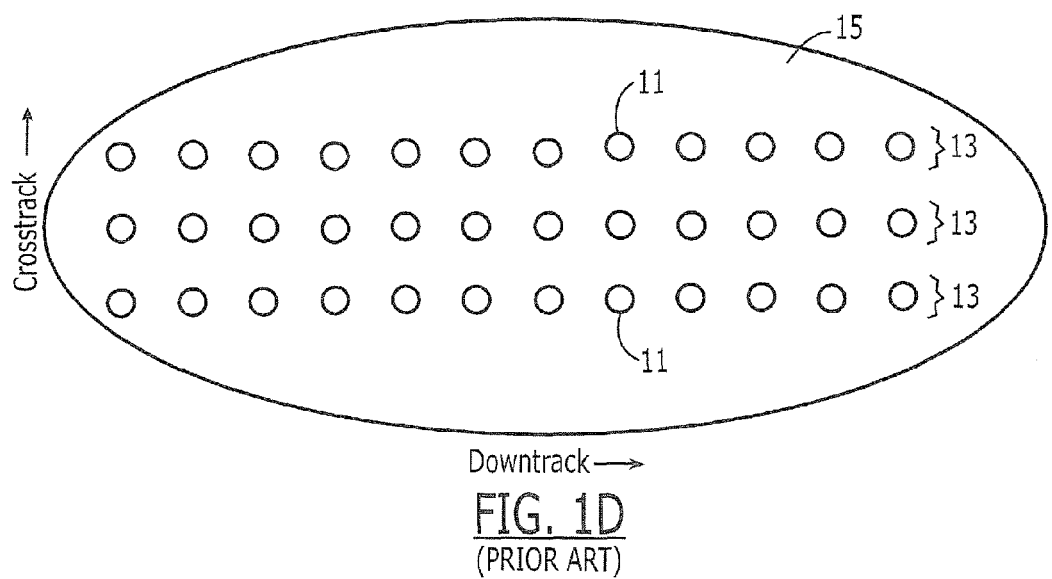
FIG. 1D illustrates a bit patterned media (BPM) configuration including a regular array of patterned bits on a magnetic recording layer.

Various embodiments will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor responsive to servo control bursts on a movable medium.

As noted above, a disk track includes data sectors and servo sectors. In a disk using a Bit Patterned Media (BPM) recording scheme having a pattern of magnetic islands, or dots, on the disk surface, data is stored in the data sectors by selectively magnetizing the dots in a desired pattern. In contrast to data sectors, information in the servo sectors may be defined at the time of disk manufacture. Moreover, rather than being encoded in magnetic transitions from dot to dot, information in the servo sectors can be encoded by the physical arrangement of dots and gaps on the disk surface. That is, servo information can be encoded in the spacing and/or sizing of dots on the disk surface. As such information may be independent of magnetic polarity, all dots in the servo sectors may be DC erased, or set to a single polarity by a DC field.

Encoding servo information in the physical arrangement of dots in the servo sectors can provide for timing-based servo control. Timing based servo patterns may provide benefits, such as better linearity characteristics, compensation for timing acquisition errors, and/or robustness to cross-track amplitude variation, particularly as the dot density increases. Hence, the design of such patterns may prove beneficial to support BPM technology for higher areal density targets.

Figure 2:
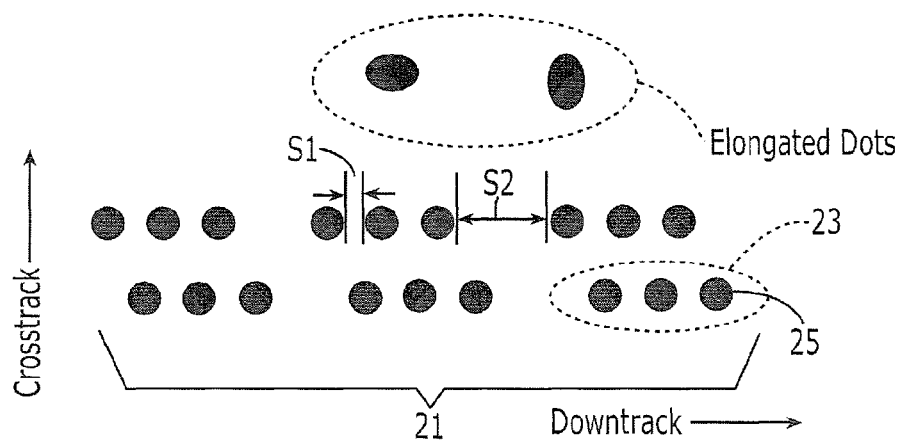
FIG. 2 illustrates BPM patterns according to some embodiments.

According to some embodiments, a timing based servo pattern for BPM includes single dots or collections of dots, referred to herein as a "dot composites," that are arranged periodically in cross-track and down-track directions on a disk surface to form a servo burst pattern. The dots in a dot composite may or may not be separated. For example, FIG. 2 illustrates a BPM pattern 21 including a plurality of dot composites 23, each of which includes three dots 25. A spacing S1 between adjacent dots 25 in a dot composite 23 is smaller than a spacing S2 between adjacent dot composites 23. In some cases, the spacing between adjacent dots 25 in a dot composite 23 is zero (i.e. the dots may be touching).

By using dot composites instead of simply using dots, the amplitude of the readback signal may be increased. Furthermore, using dot composites may beneficially lower the frequency of the readback signal to meet the requirements of the demodulator circuit (i.e. the circuit that processes the readback signal).

As further illustrated in FIG. 2, the dots 25 may be elongated in either a down-track or cross-track direction. That is, an aspect ratio of the dots 25 (defined as the ratio of the largest dimension to the smallest dimension of a dot) may change. The aspect ratio of the dots may be changed in a cross-track and/or down-track direction. Changing the aspect ratio of the dots may increase the amplitude of the readback signal. Furthermore, the width of the dots may be increased in a cross-track direction from an inner diameter to an outer diameter to maintain a constant servo frequency for all tracks.

In a BPM servo pattern according to some embodiments, dots 25 can be arranged such that the phase of the readback signal varies monotonically in the cross-track direction. This pattern will be periodic in an interval within which the phase varies by one complete cycle (360 degrees) in the cross-track direction.

Figure 3:
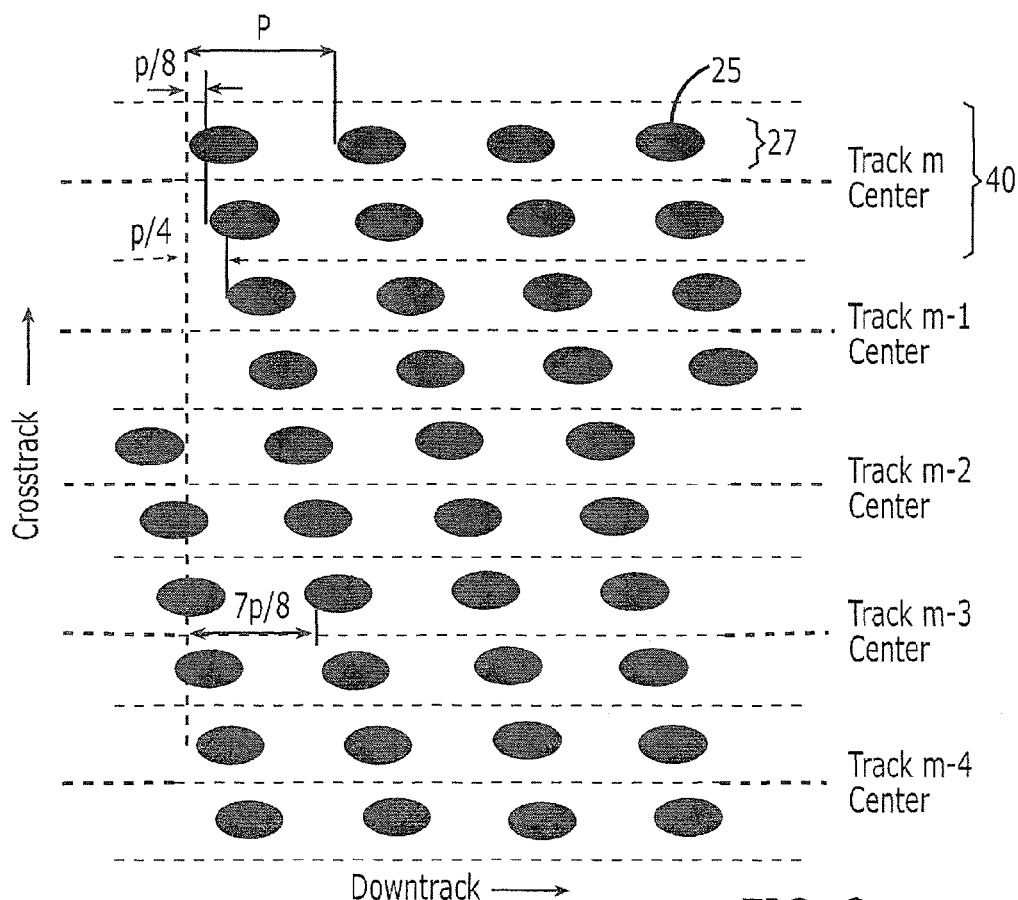
FIG. 3 illustrates a single burst BPM pattern including a plurality of elongated dots according to some embodiments.

Referring to FIG. 3, in the down track direction the dots 25 (or dot composites 23) may be arranged with a periodicity of p. The frequency of the readback signal will depend on this arrangement. The dots 25 are arranged in rows 27, and there may be multiple rows 27 per disk track 40. Each row 27 forms a subtrack of a disk track 40. The number of subtracks (defined by the rows of the dots or dot composites in the down-track direction) per track is denoted as $n_s$. In some embodiments, the phase may vary by 360 degrees per n tracks. In that case, each successive subtrack is shifted in a down-track direction by a distance of p/(n*ns) with respect to the previous subtrack. It will be appreciated that the $(n^*n_s+1)^{th}$ subtrack will be aligned in the down-track direction with the first subtrack.

As shown in FIG. 3, each track 40 includes two rows, or subtracks, 27. Thus, $n_s=2$ in the example illustrated in FIG. 3. Furthermore, the phase of the subtracks varies by 360 degrees over four tracks, so n=4. Thus, each subtrack is phase shifted in the down-track direction relative to an adjacent subtrack by a distance of p/8.

This shifting of successive subtracks will result in either a positive phase gradient (for one shift direction) or a negative phase gradient (for the opposite shift direction) with respect to the off-track position of a read/write head that is following a track. This phase gradient will give rise to a single burst phase pattern. More than one signal burst phase pattern (with different phase gradients) can be put side by side on a track to form a multiple burst pattern according to some embodiments.

A number of demodulation techniques for phase bursts can also be applied to these patterns. A demodulation technique may involve estimation of the phase (or phase components) from the readback signal, calculation of the position error signal (PES) from these phase estimates at a cross-track location, linearization, and correction of timing acquisition errors.

Estimation of the phase (or phase components) from the readback signal may be performed by correlating the readback components with sine and cosine waveforms with the same frequency as the readback and with a known phase, followed by an arctangent operation.

Calculation of the PES from the phase estimates at a cross-track location may then be performed. For a double-burst pattern with two phase components ($\theta_1$, $\theta_2$), the quantity $\theta_2-\theta_1$ may be used as the PES.

After PES calculation, a final linearization step (to make the relationship between the PES and the off-track position more linear) may be performed.

Finally, timing acquisition errors may be corrected with phase estimates from multiple bursts.

Figure 4:
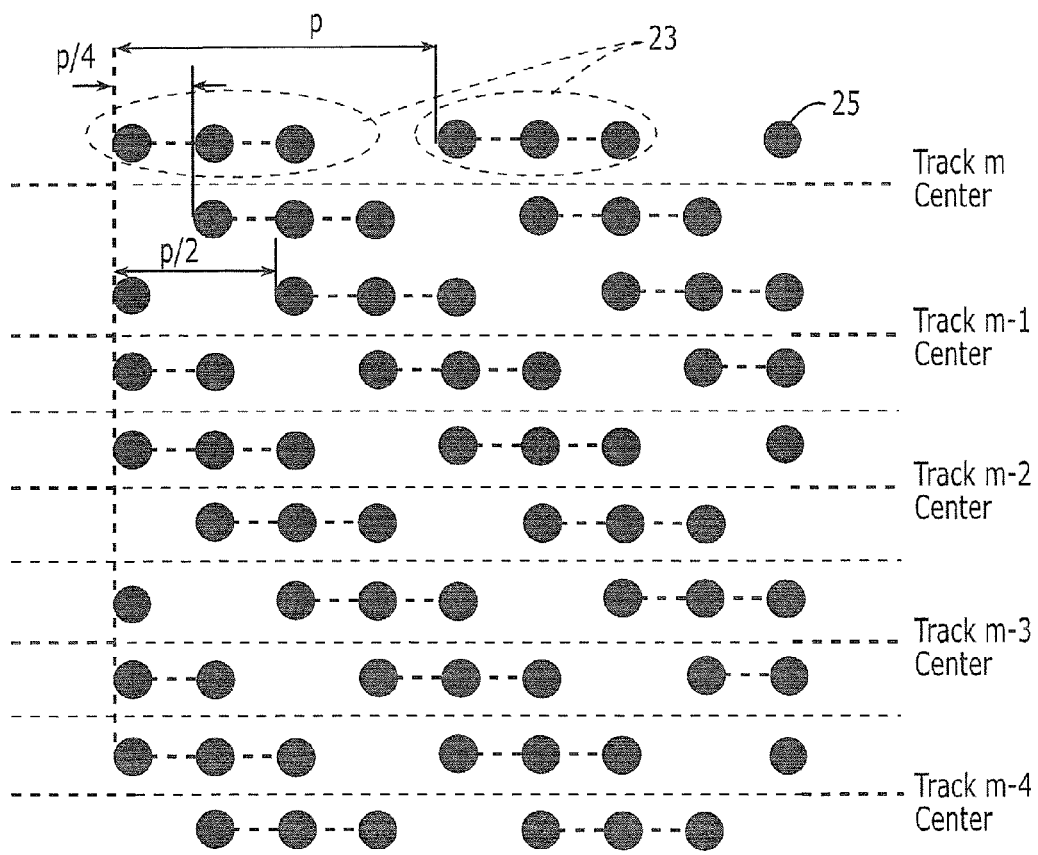
FIG. 4 illustrates a single burst pattern including a plurality of dot composites according to some embodiments.

FIG. 4 illustrates a single burst pattern using dot composites instead of single dots. As shown therein, each dot composite 23 includes three dots 25. Each track 40 includes two rows, or subtracks, 27. Thus, $n_s=2$ in the example illustrated in FIG. 4. Furthermore, the phase of the subtracks varies by 360 degrees over two tracks, so n=2. Thus, dot composites 23 in each subtrack 27 are phase shifted in the down-track direction relative to dot composites 23 in an adjacent subtrack by a distance of p/4.

Figure 5A:
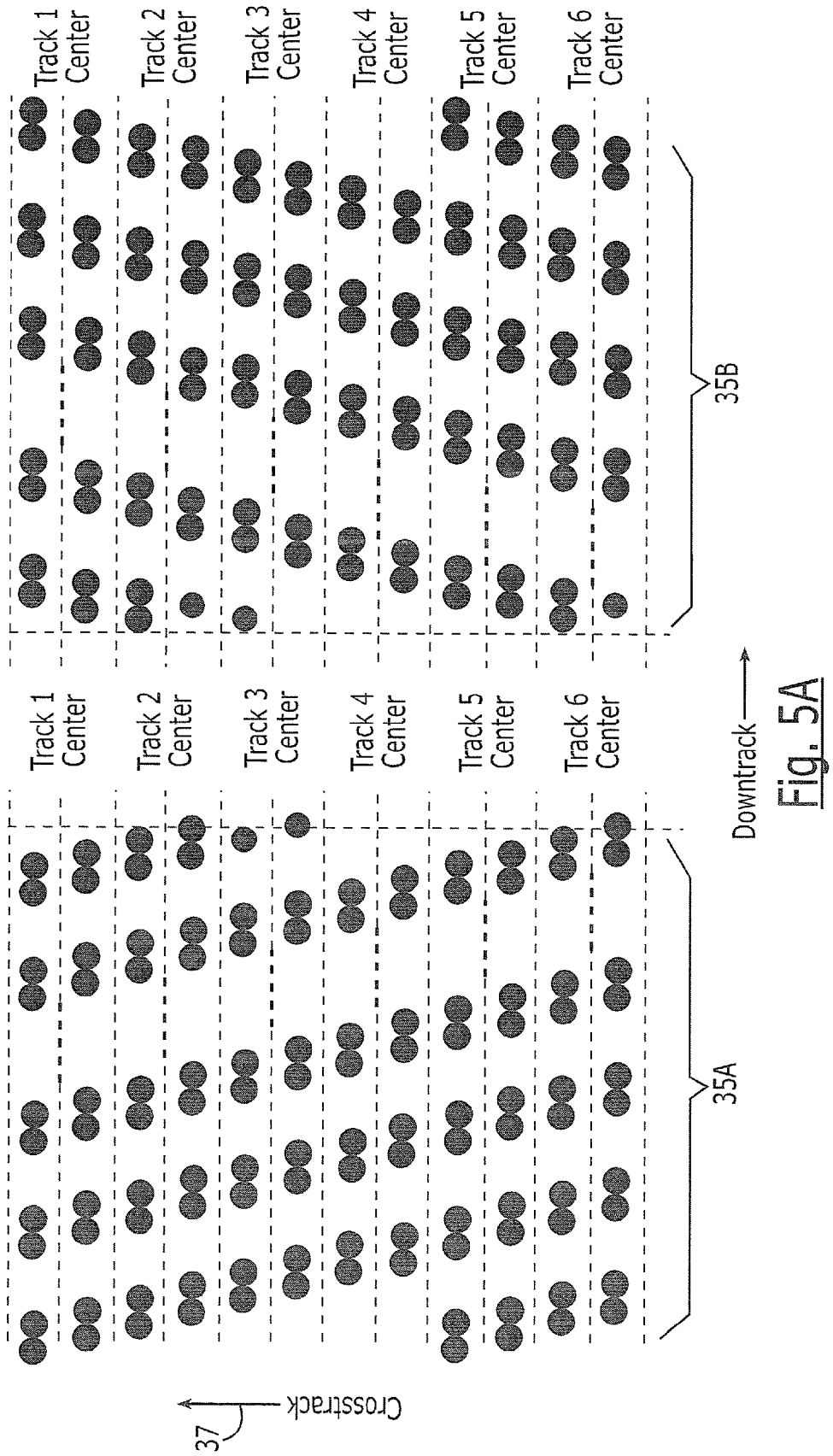
FIG. 5A illustrates burst patterns having opposite phase gradients according to some embodiments.
Figure 5B:
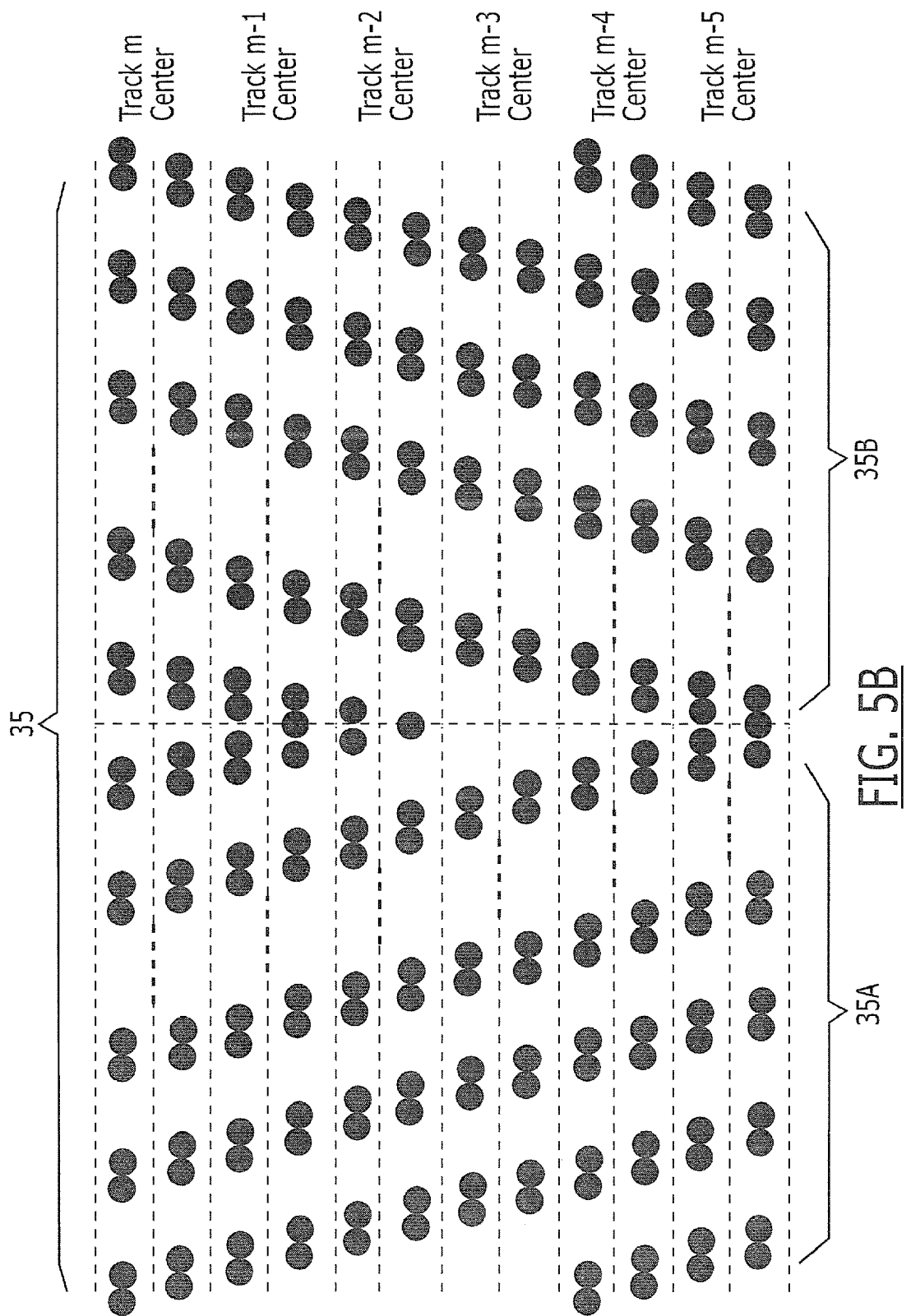
FIG. 5B illustrates a double burst pattern including burst patterns having opposite phase gradients according to some embodiments.

A multiple burst pattern with 2 bursts is illustrated in FIGS. 5A and 5B as an example. As shown therein, a first pattern 35A has a first phase gradient in the cross-track direction, while a second pattern 35B has a second phase gradient, opposite to the first phase gradient. That is, in the cross track direction indicated by the arrow 37, the phase of the first pattern 35A advances, while the phase of the second pattern recedes. The first and second patterns 35A and 35B are composed of dot composites including two dots with zero spacing between them.

Referring to FIG. 5A, the two patterns 35A, 35B are placed side by side in a servo sector on a track to form a double burst phase pattern 35 in which the phase gradient switches from positive to negative, or vice versa. In some embodiments, the first phase pattern may have a first phase gradient that has a first polarity (i.e. positive or negative) and a first magnitude. The second phase pattern may have a second phase gradient that has the same polarity as the first phase pattern but has a different magnitude from the first magnitude. Furthermore, in some embodiments, more patterns can be placed in a servo sector to form a multiple burst pattern. For example, a phase pattern could include four bursts having phase gradients with respectively different polarities and/or magnitudes.

Figure 6:
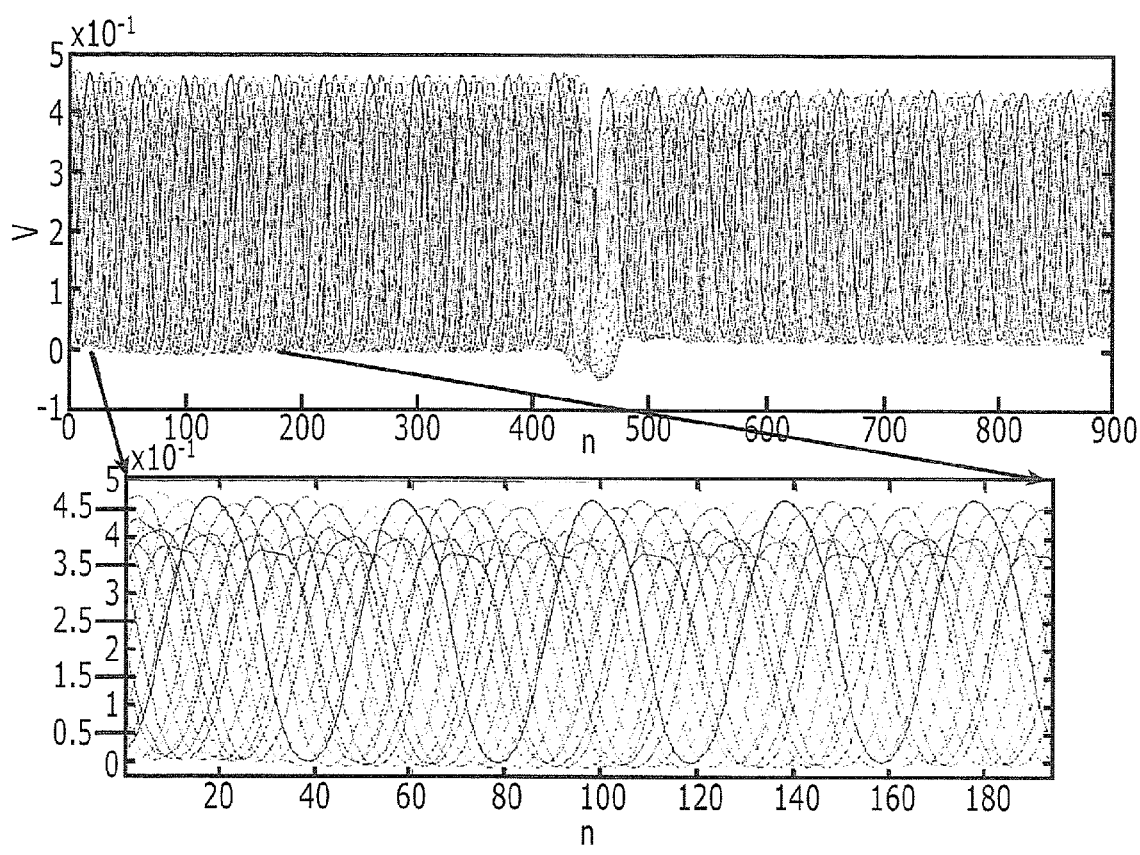
FIG. 6 illustrates possible (exemplary) readback signals corresponding to the BPM pattern illustrated in FIG. 5B.

FIG. 6 illustrates the corresponding readback signals for the BPM pattern 35 illustrated in FIG. 5B (with all the dots polarized magnetically in one direction (DC erased)). FIG. 6 shows multiple superimposed readback signals for different off-track locations. The reversal of the phase gradient is evident in the graph.

Figure 7:
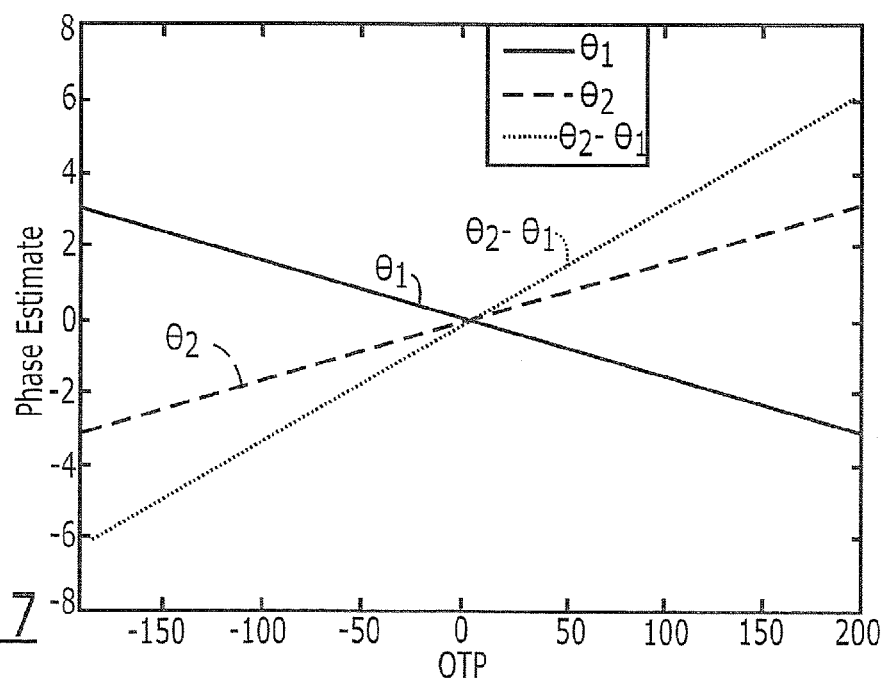
FIG. 7 illustrates phase estimates in radians obtained from the readback signals of FIG. 6 corresponding to the two burst with opposite phase gradient.

FIG. 7 illustrates phase estimates ($\theta_1$, $\theta_2$) in radians obtained from the readback signals corresponding to the two bursts, along with the quantity ($\theta_2-\theta_1$) as functions of off-track percentage (OTP) as a fraction of the track pitch. The linear dependence of $\theta_2-\theta_1$ on OTP is clearly evident in FIG. 7.

Figure 8:
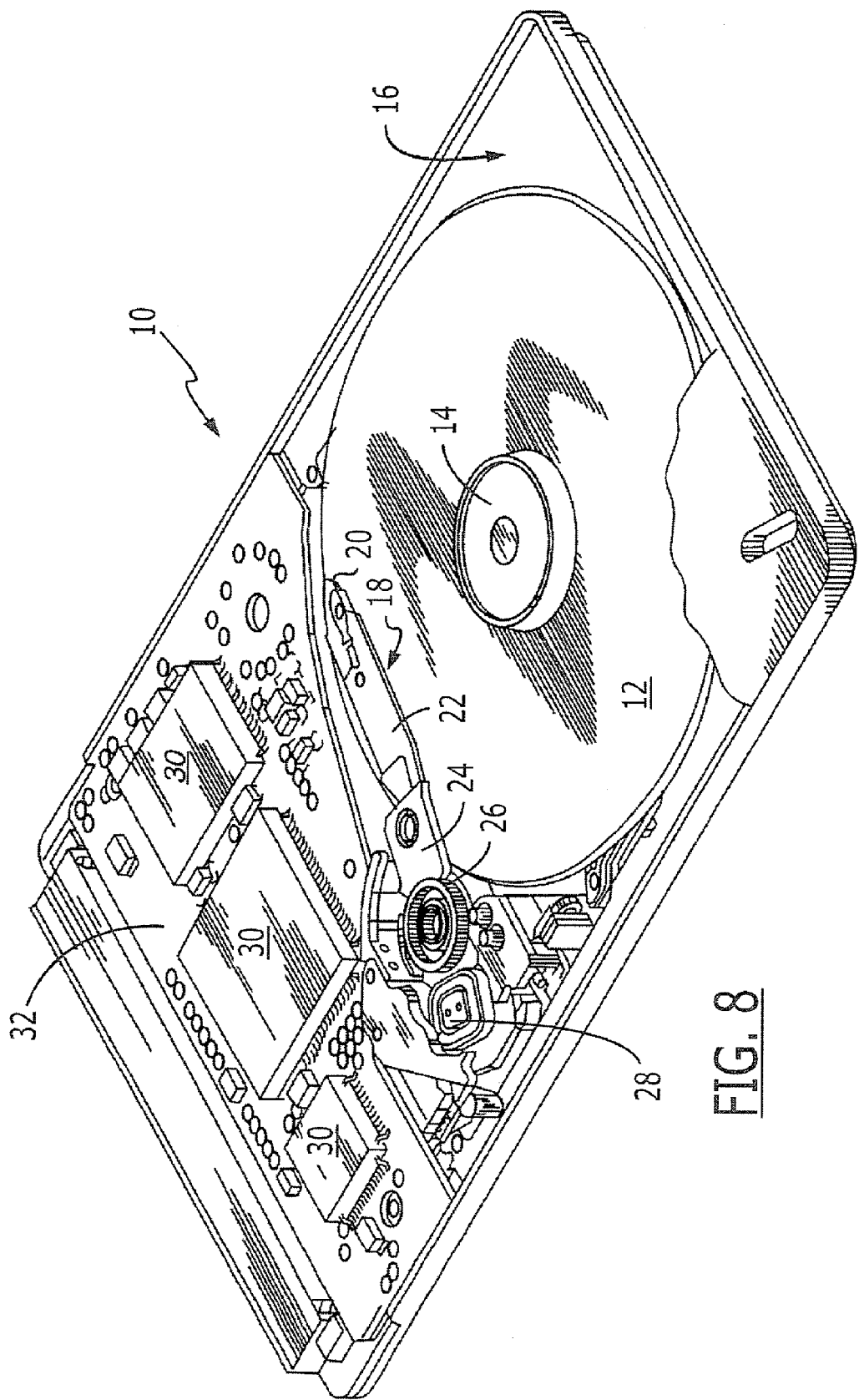
FIG. 8 is a simplified diagrammatic view of a disk drive according to some embodiments.

A simplified diagrammatic representation of a disk drive, generally designated as 100, is illustrated in FIG. 8. The disk drive 100 includes a disk stack 12 (illustrated as a single disk in FIG. 8) that is rotated about a hub 14 by a spindle motor mounted to a base plate 16. The disk stack 12 includes a plurality of disks. An actuator aim assembly 18 is also mounted to the base plate 16. The disk drive 100 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 100.

The actuator arm assembly 18 includes one or more read/write heads (or transducers) 20 mounted to a flexure arm 22 which is attached to an actuator arm 24 that can rotate about a pivot bearing assembly 26. The transducers 20 may, for example, include a magnetoresistive (MR) element and/or a thin film inductive (TFI) element. The actuator arm assembly 18 also includes a voice coil motor (VCM) 28 which radially moves the transducers 20 across the disk stack 12. The spindle motor 15 and actuator arm assembly 18 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 9:
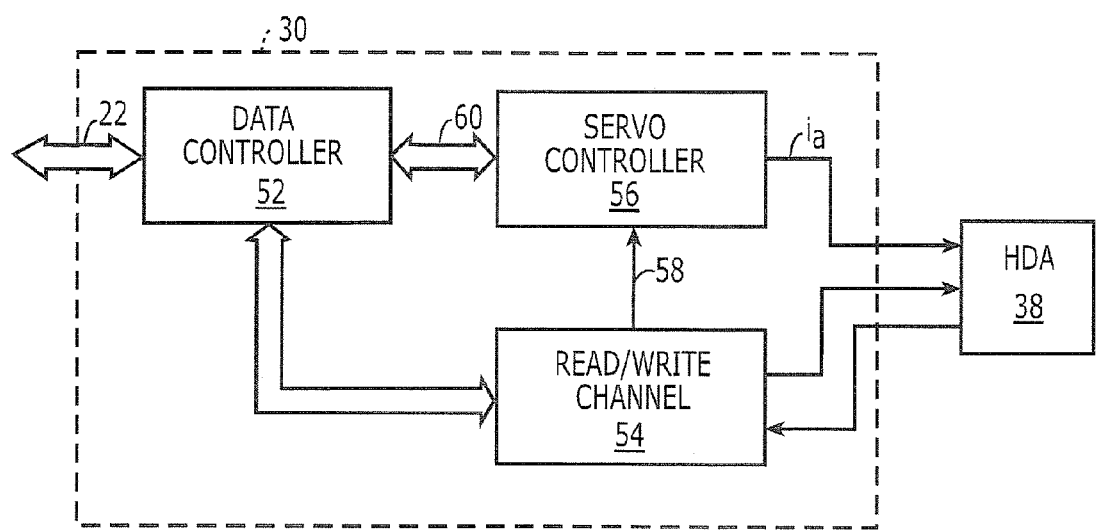
FIG. 9 is a block diagram illustrating drive electronics of a disk drive according to some embodiments.

FIG. 9 is a block diagram of a portion of the drive electronics 30 of the disk drive 100 shown in FIG. 8 that is communicatively connected to a host device. The drive electronics 30 can include a data controller 52, a servo controller 56, and a read write channel 54. Although the controllers 52 and 56, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 38 can include a plurality of the disks 34, a plurality of the transducers 20 mounted to the actuator arm assembly 22 and positioned adjacent to different data storage surfaces of the disks 34, the VCM 28, and the spindle motor.

A data transfer to/from the disk drive 100 may involve, for example, a DMA transfer of data from a host memory onto a system bus. Data from the system bus are transferred onto an I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 20. For the transfer from the CPU to the HDA 38, the read/write channel 54 converts the data to an analog form suitable for writing by the transducers 20 to the HDA 38. The read/write channel 54 also provides servo positional information read from the HDA 38 to the servo controller 56 on lines 58. For example, the concentric data tracks 40 on the storage surface 36 of a data storage disk 34 can be broken up and divided into segments by a multiplicity of regularly spaced apart embedded servo sectors. Each servo sector can include transducer location information such as a track identification field and data block address, for identifying the track and data block, and burst fields to provide fine servo location information. The transducer location information can be used to detect the location of the transducers 20 in relation to that track and data block within the track. The transducer location information is induced into the transducers 20, converted from analog signals to digital data in the read/write channel 54, and transferred to the servo controller 56. The servo controller 56 can use the transducer location information for performing seeking and track following operations of the transducers 20 over the disk tracks 40.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A recordable medium, comprising:
a servo control field comprising a bit patterned media (BPM) pattern including a plurality of dots arranged in a down-track orientation and in a cross-track orientation, wherein an aspect ratio of dots arranged on the medium in the servo control field varies in a cross-track direction.

2. The recordable medium of claim 1, wherein the dots arranged on the medium comprise a first phase pattern that has a first phase gradient in a first cross-track direction and a second phase pattern that has a second phase gradient, different from the first phase gradient, in the first cross-track direction.

3. The recordable medium of claim 2, wherein the first phase gradient is positive in the first cross-track direction and the second phase gradient is negative in the first cross-track direction.

4. The recordable medium of claim 1, wherein a phase of dots in the first phase pattern varies monotonically in the cross-track direction.

5. The recordable medium of claim 1, wherein the dots comprise a plurality of dot composites, each of the dot composites including a plurality of dots, wherein a first spacing between adjacent ones of the plurality of dots in a dot composite is less than a second spacing between adjacent ones of the plurality of dot composites.

6. The recordable medium of claim 5, wherein the first spacing is zero.

7. The recordable medium of claim 5, wherein the aspect ratio of the dots changes in a down-track direction.

8. The recordable medium of claim 5, wherein a number of dots in a dot composite changes in a cross-track direction.

9. The recordable medium of claim 1, wherein the dots are arranged in the down-track direction with a periodicity of p, each row of dots forms a subtrack of a disk track having $n_s$ subtracks, and a phase of dots in the first phase pattern varies by 360 degrees per n tracks so that each successive subtrack is shifted in a down-track direction by a distance of $p/(n*ns)$ with respect to the previous subtrack.

10. The recordable medium of claim 1, wherein the dots in the servo control field are DC erased to have a single magnetization polarity.

11. The recordable medium of claim 1, wherein the servo control field comprises a servo burst field.

12. A recordable medium, comprising:
a servo control field comprising a bit patterned media (BPM) pattern including a plurality of dots arranged in a down-track direction and in a cross-track direction, wherein an aspect ratio of dots arranged on the medium in the servo control field varies in the cross-track direction; and wherein the dots comprise a plurality of dot composites, each of the dot composites including a plurality of dots.

13. The recordable medium of claim 12, wherein a first spacing between adjacent ones of the plurality of dots in a dot composite is less than a second spacing between adjacent ones of the plurality of dot composites.

14. The recordable medium of claim 13, wherein the first spacing is zero.

15. The recordable medium of claim 12, wherein an aspect ratio of the dots changes in a down-track direction.

16. The recordable medium of claim 12, wherein a number of dots in a dot composite changes in a cross-track direction.

17. A servo control system, comprising:
   a recordable medium comprising a servo control field comprising a bit patterned media (BPM) pattern, the BPM pattern including a plurality of dots arranged in a down-track direction in a cross-track direction, wherein an aspect ratio of dots arranged on the medium in the servo control field varies in the cross-track direction and wherein the dots comprise a plurality of dot composites, each of the dot composites including a plurality of dots;
   a transducer that generates a readback signal in response to a magnetic field generated by the dots; and
   a controller that controls a position of the transducer in response to a readback signal from the transducer.

18. The servo control system of claim 17, wherein a first spacing between adjacent ones of the plurality of dots in a dot composite is less than a second spacing between adjacent ones of the plurality of dot composites.

19. The servo control system of claim 17, wherein the first spacing is zero.

20. The servo control system of claim 17, wherein the dots arranged on the medium comprise a first phase pattern that has a positive phase gradient in the first cross-track direction and a second phase pattern that has a negative phase gradient in the first cross-track direction.

21. The servo control system of claim 17, wherein the dots are arranged in the down-track direction with a periodicity of p, each row of dots forms a subtrack of a disk track having $n_s$ subtracks, and a phase of dots in the first phase pattern varies by 360 degrees per n tracks so that each successive subtrack is shifted in a down-track direction by a distance of $p/(n*ns)$ with respect to the previous subtrack.

\* \* \* \* \*